United States Patent [19]

Trautvetter et al.

[11] 4,200,568

[45] Apr. 29, 1980

[54] POLYVINYLIDENE FLUORIDE COMPOSITIONS, AND FABRICATED PRODUCTS THEREOF HAVING INCREASED NOTCH IMPACT TOUGHNESS AND ELONGATION AT RUPTURE

[75] Inventors: Werner Trautvetter, Troisdorf-Spich; Gregor Weisgerber, Königswinter-Berhausen, both of Fed. Rep. of Germany

[73] Assignee: Dynamit Nobel Aktiengesellschaft, Troisdorf, Fed. Rep. of Germany

[21] Appl. No.: 11,346

[22] Filed: Feb. 12, 1979

Related U.S. Application Data

[63] Continuation of Ser. No. 804,698, Jun. 8, 1977, abandoned, which is a continuation of Ser. No. 609,870, Sep. 2, 1975, abandoned.

[30] Foreign Application Priority Data

Sep. 3, 1974 [DE] Fed. Rep. of Germany ....... 2442173

[51] Int. Cl.$^2$ ................... C08L 27/16; C08L 27/20
[52] U.S. Cl. ................................ 260/42.47; 525/199
[58] Field of Search .............................. 260/900, 42.27

[56] References Cited

U.S. PATENT DOCUMENTS

| | | | |
|---|---|---|---|
| 3,769,371 | 10/1973 | Nersasian | 260/900 |
| 3,864,228 | 2/1975 | Rossetti | 260/900 |
| 3,872,065 | 3/1975 | Schmiegel | 526/52.1 X |
| 3,876,654 | 4/1975 | Pattison | 260/900 |

OTHER PUBLICATIONS

"Materials and Compounding for Rubber"–May, 1975, p. 92.

*Primary Examiner*—Carman J. Seccuro
*Attorney, Agent, or Firm*—Sprung, Felfe, Horn, Lynch & Kramer

[57] ABSTRACT

A composition comprising a polyvinylidene fluoride and a fluoroelastomer, especially a fluoroelastomer containing moieties of vinylidene fluoride and hexa- or pentafluoropropylene, and methods for the preparation of formed articles from such composition and formed articles thereof having improved notch impact toughness and elongation at rupture.

31 Claims, No Drawings

POLYVINYLIDENE FLUORIDE COMPOSITIONS, AND FABRICATED PRODUCTS THEREOF HAVING INCREASED NOTCH IMPACT TOUGHNESS AND ELONGATION AT RUPTURE

This is a continuation, filed June 8, 1977, now abandoned, which in turn is a continuation of 609,870 filed Sept. 2, 1975 (now abandoned).

BACKGROUND OF THE INVENTION

1. Field of the Invention

This invention relates to a new polyvinylidene fluoride composition improved by the presence of a fluoroelastomer. This invention is particularly directed to a composition which, when formed into a finished article provides the finished article with improved notch impact toughness and elongation at rupture. This invention is particularly concerned with improving the impact strength and elongation at rupture characteristics of polyvinylidene fluoride products.

2. DISCUSSION OF THE PRIOR ART

Polyvinylidene fluoride ($PVF_2$) has been used in the fabrication of many articles, including articles employed as chemical apparatuses, for example. It is known that polyvinylidene fluoride is characterized by good thermal, electrical and chemical properties. However, while the thermal and the chemical properties of polyvinylidene fluoride as a rule, satisfy the requirements that have been made therefor, in a number of special applications the mechanical characteristics are inadequate. Thus, it has been found that the mechanical characteristics in respect of notch impact toughness and elongation at rupture of polyvinylidene fluoride finished articles are insufficient.

It would be possible to improve these characteristics by internal or external plasticizing. However, when a plasticized is added to a polyvinylidene fluoride composition there is observed the impairment of other properties, such as tensile strength, thermal stability of shape or chemical resistance. Therefore, the use of internal or external plasticizers to improve the notch impact toughness and elongation at rupture of polyvinylidene articles, is not a practical approach.

It therefore became desirable to provide an improved polyvinylidene fluoride composition which when formed into a finished polyvinylidene fluoride article would impart to that article improved notch impact toughness and improved elongation at rupture. It became particularly desirable to provide a new polyvinylidene fluoride composition which would not materially alter the otherwise good thermal stability of shape, tensile strength and chemical resistance of the polyvinylidene fluoride finished article.

SUMMARY OF THE INVENTION

The long felt desideratum in the art has been answered, in accordance with this invention, by a composition comprising polyvinylidene fluoride and a fluorelastomer. It has been found, in accordance with the invention, that if the polyvinylidene fluoride has mixed therewith a fluoroelastomer, such as in an amount between 1 and 30%, by weight, based upon the weight of the polyvinylidene fluoride, the finished articles thereof have vastly improved notch impact strength and elongation at rupture. In some instances the improvement can be as high as about 200%.

Thus, the present invention is concerned with polyvinylidene fluoride finished articles of greatly improved notch impact toughness and elongation at rupture which articles are characterized in that they contain a fluoroelastomer. The fluoroelastomer can be present in the finished article in a cross-link or a non-cross-linked form, depending upon whether the composition additionally contains a cross-linking agent.

Non-cross-linked fluoroelastomers incorporated into the polyvinylidene fluoride improve the notch impact toughness of the latter, and are most appropriate in many applications. However, since they also reduce the Vicat temperature, to a certain extent they act as plasticizers. The use of fluoroelastomers free of cross-linking agent for the improvement of the notch impact toughness and elongation at rupture of products fabricated from polyvinylidene fluoride is therefore recommended when thermal characteristics in the finished article are of no particular significance.

In accordance with this invention it has been further found that articles of polyvinylidene fluoride of improved notch impact toughness and elongation at rupture also have desirably high values in respect of thermal stabilities and tensile strength can be provided if the composition additionally contains a cross-linking agent for the fluoroelastomer. Cross-linking agents which can be included in the polyvinylidene fluoride-fluoroelastomer compositions are conventional cross-linking agents, such as, for example, aliphatic or cycloaliphatic diamine derivatives, especially derivatives of diamines of alkanes and alkenes of between 4 and 18 carbon atoms and diamines of hydrocarbonaceous cycloaliphatic compounds comprising 1 or 2 rings and containing between 6 and 18 carbon atoms in the ring. Aromatic dihydroxy compounds can also be used, particularly in accordance with an accelerator, e.g., an organic base. When these compositions are employed, the elastomer will cross-link during the thermoplastic fabrication of the polyvinylidene fluoride-fluoroelastomer compound and unexpectedly, there is provided a great increase of impact toughness and elongation at rupture with little or virtually no impairment of the tensile strength or thermal stability of shape (as determined by Vicat's method, for example). By the use of this procedure, these characteristics attain values amounting to as much as three times those obtained with polyvinylidene fluoride product to which there has not been added any fluoroelastomer.

DESCRIPTION OF SPECIFIC EMBODIMENTS

In the fabrication of finished or formed articles of polyvinylidene fluoride there is employed polyvinylidene fluorides which are of the thermoplastically workable type. These polyvinylidene fluorides have a reduced viscosity $\eta_{red}$ (measured at 120° C. on an 0.5% solution in cyclohexanone) between 80 and 200 ml/g. The polymers have a melt flow index (MFI), (measured pursuant to ASTM D 1238 Cond. j) of about 1 to about 200. They have an average molecular weight $\overline{M}n$ (measured osmotically at 90° C. in dimethylformamide) of about 50,000 to about 250,000. Such polyvinylidene fluorides can be prepared by known methods.

While numerous fluoroelastomers can be employed, those fluoroelastomers particularly contemplated include copolymers of 75-85 mole percent of vinylidene fluoride and 15-25 mole percent of hexafluoropropylene or pentafluoropropylene or a mixture thereof. There is also particularly contemplated the use of a fluoroelastomer which is a terpolymer composed of 50-80 mole percent of vinylidene fluoride, 15-25 mole percent of hexa- or pentafluoropropylene and 5-25 mole percent of tetrafluoroethylene. These copolymers have reduced viscosities $\eta_{red}$ between 60 and 400 ml/g (measured at 30° C. on a 0.5% solution in acetone). Products of such composition are known and are obtained commercially under a variety of names. The amount of the magnesium oxide and/or calcium hydroxide acid acceptors which may be present, would be from 5-15 grams per 100 grams of fluoroelastomer.

The aliphatic or cycloaliphatic diamine derivatives known as cross-linking agents include, for example, hexamethylenediamine carbamate, 4,4'-methylene-bis-cyclohexylamine carbamate and dicinnamylidene-1,6-hexanediamine. They are used in amounts between 5 and 15 millimoles per 100 grams of fluoroelastomer. The aromatic dihydroxy compounds also known as cross-linking agent, such as, for example, hydroquinone, bisphenols such as bisphenol A, bisphenol AF (hexafluorisopropylidene-bis-4-hydroxybenzene), bisphenol S (4,4'-dihydroxydiphenylsulfone), p,p'-biphenol, 2,4-dihydroxybenzophenone and phenolphthalein, etc., are used also in amounts of 5-15 mmol per 100 grams of elastomer, a vulcanization accelerator also being necessary, which is added in amounts of 0.2-20 mmol, preferably 0.5-5 mmol per 100 gram of elastomer.

Preferred as vulcanization accelerators are organic bases or their salts. These include secondary or tertiary aliphatic amines, each chain of the amine containing 1 to 18 C atoms, whereby the chains can have the same or different length, or secondary or tertiary cycloaliphatic amines containing 5 to 8 C atoms in each ring. These aliphatic is cycloaliphatic amines shall have a boiling point above 150° C. Examples of such aliphatic and cycloaliphatic amines are: tributylamine and dicyclohexylamine. There can also be employed quaternary aliphatic cl aliphatic-aromatic ammonium salts especially quaternary aliphatic a aliphatic-aromatic ammonium salts in which each organic group is an alkane of 1 to 18 C atoms, an alkene of 2 to 13 C atoms or an aryl group of 6 to 12 C atoms. A particularly contemplated quaternary aliphatic ammonium compound is methyltrioctylammonium chloride. Additionally, there can be employed as a vulcanization accelerator an aliphatic or aliphatic-aromatic phosphonium salt. Similarly, where a phosphonium salt is employed, each aliphatic group will have been 2 and 18 carbon atoms in the chain and is preferably a hydrocarbonaceous chain such as an alkyl or alkenyl group. Where an aliphatic-aromatic phosphonium salt is employed, the aromatic portion will contain between 6 and 12 carbon atoms in each aryl group, exclusive of any substituents on the ring. Particularly contemplated is benzyltriphenylphosphonium chloride and allyl triphenyl phosphonium chloride The addition of such pigments as are also suitable for the pigmentation of plain $PVF_2$, such as carbon black, for example, can also be made to the $PVF_2$ fluoroelastomer compositions.

The mixing of the polyvinylidene fluoride with the fluoroelastomer and with the cross-linkers, accelerators, basic oxides and pigments as required, can be performed by various methods, for example by the precipitation of a fluoroelastomer latex onto $PVF_2$ powder, or by the precipitation of $PVF_2$ latex and fluoroelastomer latex together, or by impregnating $PVF_2$ with a fluoroelastomer solution, in acetone for example, and then mixing with the cross-linking additives in the dry state.

Compounding can also be performed by mixing the components on a roller mixer or in a kneader in the plastic state.

It is advantageous, however, first to mix the fluoroelastomer with the vulcanization additives separately, e.g., on a cooled roller mixer, and then to incorporate this mixture into the melted polyvinylidene fluoride, at 200° C. on a roller mixer, for example. The thermoplastic fabrication of the $PVF_2$-fluoroelastomer compositions thus obtained is performed by conventional methods such as pressing in suitable molds, calendering, extrusion, injection molding, etc., at the temperatures commonly used for $PVF_2$, such as 180° to 280° C., for example.

It is desirable under certain circumstances to heat treat the products following fabrication, for the purpose of completing the crosslinking. A suitable temperature for such treatment is, for example, 150° C., for a period of, for example, 24 hours.

The mechanical characteristics of the compositions are determined by measuring tensile strength and elongation at rupture pursuant to DIN 53,504 on standard bar specimens S 1 cut from 1 mm thick pressed boards; the notch impact strength at 23° C. is determined pursuant to DIN 53,453 on a 4 mm thick test specimens. The thermal stability of shape is tested by measuring the Vicat softening temperature pursuant to DIN 53,460B.

It has been found that the addition of up to about 10% by weight of fluoroelastomers together with cross-linking agents provides a definite increase in the notch impact toughness and elongation at rupture. However, the extent of improvement depends upon the cross-linking system employed. These advantages are obtained without appreciably diminishing the thermal stability of shape and the tensile strength of the finished article. Not until the addition of about 25-30% of fluoroelastomer in combination with cross-linking agent does the Vicat temperature begin to decrease, depending, again, on the type of cross-linking agent employed. Elastomer additions greater than 30%, therefore, appear to be uncalled for. The possibility is thus created of altering the characteristics of the compositions to answer for the particular requirements of a finished article. The amount of fluoroelastomer and the amount of cross-linking agent can be conveniently regulated, within the amounts given above, to provide a finished article which will satisfy all of its physical requirements.

As will be seen in the comparative Example 16 below, the improvement of the mechanical characteristics is not attributable to the oxides or hydroxides present as components of the cross-linking system since components by themselves impair the characteristics of the polyvinylidene fluoride as seen in the study of Example 15.

In order to more fully illustrate the nature of the invention, the manner of practicing the same, the following Examples are presented. These Examples show a vast improvement in the notch impact toughness and the elongation at rupture when compared with the compositions free of fluoroelastomer.

EXAMPLES 1 to 5

Preparation of a vulcanizable fluoroelastomer mixture

On a water-cooled laboratory roller mixer, 100 g of fluoroelastomer, the oxides and hydroxides specified in Table 1, and the specified cross-linking agents and accelerators (unless they were already contained in the elastomer) were mixed for 15 minutes. The roller skins were stored, cooled and used for Examples 6 to 15.

TABLE 1

| Example | 1 | 2 | 3 | 4 | 5 |
|---|---|---|---|---|---|
| Fluoroelastomer | VF$_2$/HFP-Copolymer[1] | VF$_2$/HFP-Copolymer[1] | VF$_2$/HFP-Copolymer[2] | VF$_2$/HFP-Copolymer 2 | VF$_2$/HFP-Copolymer[3] |
| Oxide | MgO | MgO | MgO | MgO | MgO |
| Quantity* | 3 | 3 | 15 | 15 | 3 |
| Hydroxide | Ca(CH)$_2$ | Ca(OH)$_2$ | — | — | Ca(CH)$_2$ |
| Quantity* | 6 | 6 | — | — | 6 |
| Pigment | — | — | — | Carbon Black | — |
| Quantity* | | | | 6.2 | |
| Cross-linking Agent | Bisphenol AF | p,p'-Bisphenol | Diamine Carbamate[4] | Diamine Carbamate[4] | — |
| Quantity* | 2.7 | 1.9 | 2.0 | 2.0 | |
| Accelerator | Allyl-Phe$_3$P+Cl$^-$ | Me-Oct$_3$N+Cl$^-$ | | | |
| Quantity* | 0.3 | 0.3 | — | — | — |

EXAMPLES 6 to 14

Preparation of Pressed Boards from PVF$_2$ Fluoroelastomer Compositions

PVF$_2$ having a melt flow index of 15 was plasticized on a laboratory roller mixer at 190° C., and then the quantity specified in Table 2 of fluoroelastomer mixture was added in the form of small pieces of the roller skin from Examples 1–4). After about 5 minutes the mixture was homogeneous. The PVF$_2$ fluoroelastomer roller skin was cut into pieces of suitable size and compressed at 190° C. and at a pressure of 10 to 300 kp/cm$^2$ in suitable molds to form boards 1 and 4 mm thick. Pressing time: 7–15 minutes.

TABLE 2

| Example | Grams of PVP$_2$ | Grams of fluoroelastomer | From Example |
|---|---|---|---|
| 6 | 198 | 2 | 1 |
| 7 | 190 | 10 | 1 |
| 8 | 180 | 20 | 1 |
| 9 | 160 | 40 | 1 |
| 10 | 140 | 60 | 1 |
| 11 | 180 | 20 | 2 |
| 12 | 180 | 20 | 3 |
| 13 | 180 | 20 | 4 |
| 14 | 180 | 20 | 3, but without the cross-linking agent and Mgo |

EXAMPLE 15 (For comparison)

200 g of PVF$_2$ is plasticized as in Examples 6 to 14 for 5 minutes at 190° C. on the roller mixer. Boards 1 and 4 mm thick are pressed from the roller skin.

EXAMPLE 16 (For comparison)

200 g of PVF$_2$ is mixed with 0.55 g of MgO and 1.1 g of Ca(OH)$_2$, plasticized as in Examples 6–14, and pressed to form boards. The amount of oxides and hydroxides is the same as that contained in a composition containing 10% cross-linked elastomer (Examples 8 and 11).

The characteristics of the boards obtained in accordance with Examples 6 to 16 are shown in Table 3.

TABLE 3

Characteristics of PVF$_2$ - Fluoroelastomer Compositions

| Example | Fluoroelastomer Content (%) | from Example | Vicat-Temp. (°C.) | Notch Impact Toughness (kp cm/cm$^2$) 23° C. | Tensile Strength (kp/cm$^2$)/ Elongation at Rupture |
|---|---|---|---|---|---|
| 6 | 1 | (1) | 131.5 | 18 | 510 / 185 |
| 7 | 5 | (1) | 132 | 24 | 460 / 250 |
| 8 | 10 | (1) | 130.5 | 31 | 485 / 430 |
| 9 | 20 | (1) | 115 | 45 | 425 / 425 |
| 10 | 30 | (1) | 113 | 45 | 370 / 375 |
| 11 | 10 | (2) | 123 | 27 | 445 / 340 |
| 12 | 10 | (3) | 123 | 39 | 430 / 280 |
| 13 | 10 | (4) | 123 | 44 | 430 / 285 |
| 14 | 10 | — | 115.5 | 33 | 425 / 190 |
| 15 | — | — | 131 | 16 | 530 / 155 |
| 16 | — | — | 131 | 11 | 505 / 30 |

EXAMPLE 17

Preparation of a Board from PVF$_2$ Fluoroelastomer Composition, followed by heat treatment 180 g of PVF$_2$ having an MFI of 21 was plasticized as described in Examples 6 to 14 and compounded on the roller mixer with 20 g of fluoroelastomer mixture from Example 5. The 4 mm thick boards prepared therefrom had a notch impact toughness of 18 kpcm/cm$^2$. After 20 hours of heat treatment at 145° C., the notch impact toughness increased to 22 kpcm/cm$^2$. The notch impact toughness of the plain PVF$_2$ of MFI 21 forming the basis of the composition amounted to 12 kpcm/cm$^2$ and was not changed by heat treatment as above.

Glossary of Abreviations:
  Allyl-Phe$_3$  P+Cl$^-$ =Allyltriphenylphosphonium chloride
  Me-Oct$_3$ N+Cl$^-$ =Methyltrioctylammonium chloride
  *=per 100 grams of fluoroelastomer
  (1)=21 mole-% HFP
  (2)=19 mole-% HFP
  (3)=Copolymer; containing the cross-linking system; commercially obtainable under the name Viton $^R$E 60° C.
  (4)=4,4'-methylene-bis-cyclohexylamine carbamate VF$_2$=vinylidene fluoride
HFP=hexafluoro propylene
PVF$_2$=polyvinylidene fluoride

What is claimed is:

1. A cross-linkable composition comprising polyvinylidene fluoride and between 1 and 30 percent by weight of a fluoroelastomer having a reduced viscosity between 60 and 400 ml/g, measured at 30° C. on a 0.5 solution in acetone, said fluoroelastomer being a copolymer of 75–85 mol percent of vinylidene fluoride and 15–25 mol percent of hexafluoropropylene or pentafluoropropylene or a mixture thereof, said composition containing a chemical cross-linking agent.

2. A composition comprising polyvinylidene fluoride and 1 to 30 percent by weight of a fluoroelastomer which is a terpolymer of 50–80 mol percent of vinylidene fluoride, 5–25 mol percent of tetrafluoroethylene and 15–25 mol percent of hexafluoropropylene or pentafluoropropylene and a chemical cross-linking agent.

3. A composition according to claim 1 wherein said polyvinylidene fluoride has a reduced viscosity, measured at 120° C. on a 0.5% solution in cyclohexanone, between 80 and 200 ml/g, a melt flow index number, measured pursuant to ASTM D 1238, Cond. j, of about 1 to 200 and an average molecular weight, measured osmotically at 90° C. in dimethylformamide, of 50,000 to about 250,000.

4. A composition according to claim 1 wherein said cross-linking agent is an aliphatic or cycloaliphatic diamine derivative and is present in an amount of 5–15 millimoles per 100 grams of fluoroelastomer.

5. A composition according to claim 1 wherein said cross-linking agent is an aromatic dihydroxy compound and is present in an amount of 5–15 millimoles per 100 grams of fluoroelastomer.

6. A composition according to claim 7 wherein said cross-linking agent is selected from the group consisting of hexamethylene diamine carbamate, 4,4'-methylene-bis-cyclohexylamine carbamate and dicinnamylidene-1,6-hexane diamine.

7. A composition according to claim 5 wherein said cross-linking agent is selected from the group consisting of hydroquinone, a bisphenol, p,p'-biphenol, 2,4-dihydroxybenzopheneone and a phenolphthalein.

8. A composition according to claim 7 wherein said cross-linking agent is a bisphenol and the bisphenol is bisphenol A, bisphenol AF or bisphenol S.

9. A composition according to claim 5 wherein the composition additionally contains a vulcanization accelerator which is present in an amount of 0.2 to 20 millimoles per 100 grams elastomer.

10. A composition according to claim 9 wherein the vulcanization accelerator is present in an amount of 0.5 to 5 millimoles per 100 grams of elastomer.

11. A composition according to claim 9 wherein the vulcanization accelerator is selected from the group consisting of a secondary aliphatic amine, a tertiary aliphatic amine, a cycloaliphatic amine having a boiling point above 150° C., a quaternary ammonium salt, an aliphatic phosphonium salt and an aliphatic-aromatic phosphonium salt.

12. A composition according to claim 11, wherein said vulcanization accelerator is selected from the group consisting of tributylamine, dicyclohexylamine, methyltrioctylammonium chloride allyltriphenylphosphonium chloride and benzyltriphenyl phosphonium chloride.

13. A cross-linkable composition according to claim 1 containing magnesium oxide or calcium hydroxide as an acid acceptor.

14. A cross-linkable composition according to claim 13 wherein the magnesium oxide or calcium hydroxide is present in an amount of 5 to 15 gm per 100 gm of fluoroelastomer.

15. A composition according to claim 13 wherein the cross-linking agent is bisphenol AF.

16. A composition according to claim 13 wherein the cross-linking agent is p,p'-bisphenol.

17. A composition according to claim 13 wherein the cross-linking agent is diamine carbamate.

18. A composition according to claim 15 additionally containing an accelerator, said accelerator being allyltriphenyl phosphonium chloride.

19. A composition according to claim 16 containing an accelerator, said accelerator being methyltrioctylammonium chloride.

20. A process for forming an article from a molding composition comprising polyvinylidene fluoride, the improvement which comprises employing as the composition, the composition of claim 1.

21. In a process for forming an article from a composition comprising polyvinylidene fluoride, the improvement which comprises employing as the composition, the composition of claim 1.

22. In a process for forming an article from a composition comprising polyvinylidene fluoride, the improvement which comprises employing as the composition, the composition of claim 9.

23. A process according to claim 20 wherein the composition is passed through a pair of calendar rollers to prepare a sheet thereof.

24. A process according to claim 20 wherein said article is formed by filling a mold with said composition and compressing said composition in said mold.

25. A process according to claim 20 wherein said article of said composition is formed by passing said composition in heated form through an extrusion die and an extrudite thereof is formed and cooled.

26. A process according to claim 20 wherein said article is formed by heating the composition in an injection molding machine and in a plastified condition injecting said composition into a mold.

27. A formed article of the composition of claim 1.

28. A formed article of the composition of claim 1.

29. A formed article of the composition of claim 9.

30. A process for improving the notch impact toughness and other physical properties of a polyvinylidene fluoride molding composition which consists essentially of:
(a) adding to a polyvinylidene fluoride resinous composition between 1 and 30 weight percent of a fluoroelastomer having a reduced viscosity between 60 and 400 ml/g measured at 30° C. on a 0.5 solution in acetone, said fluoroelastomer being a copolymer of 75–85 mol percent of vinylidene fluoride and 15–25 mol percent of hexafluoropropylene or pentafluoropropylene or a mixture thereof; (b) compounding the resulting polyvinylidene fluoride-fluoroelastomer composition together with a chemical curing agent; and
(c) subjecting the compounded composition to a temperature of 180° to 280° C.

31. A process according to claim 30 wherein the fluorelastomer is initially mixed with a vulcanizer additive on a cooled roller mixer and thereafter the fluoroelastomer-vulcanizer composition is added to melted polyvinylidene fluoride and the polyvinylidene-fluoroelastomer composition is subjected to thermoplastic fabrication at a temperature of 180° to 280° C.

* * * * *

UNITED STATES PATENT AND TRADEMARK OFFICE
CERTIFICATE OF CORRECTION

PATENT NO. : 4,200,568
DATED : April 29, 1980
INVENTOR(S) : Werner Trautvetter et al.

It is certified that error appears in the above—identified patent and that said Letters Patent is hereby corrected as shown below:

In Column 5, Table 1, Example 1, "$Ca(CH)_2$" should be --$Ca(OH)_2$--.

In Column 5, Table 1, Example 5, "$Ca(CH)_2$" should be --$Ca(OH)_2$--.

UNITED STATES PATENT AND TRADEMARK OFFICE
CERTIFICATE OF CORRECTION

PATENT NO. : 4,200,568
DATED : April 29, 1980
INVENTOR(S) : Werner Trautvetter et al.

It is certified that error appears in the above—identified patent and that said Letters Patent is hereby corrected as shown below:

Column 1, line 39, "plasticized" should be --plasticizer--.

Column 1, line 61, "fluorelastomer" should be --fluoroelastomer--

Column 2, line 34, delete "in the ring".

Column 2, line 36, "accordance" should be --combination--.

Column 3, line 33, "is" should be --or--.

Column 3, line 38, "cl" should be --or--.

Column 3, line 39, "a" should be --or--.

Column 3, line 41, "13" should be --18--.

Signed and Sealed this

Fifteenth Day of July 1980

[SEAL]

Attest:

SIDNEY A. DIAMOND

Attesting Officer

Commissioner of Patents and Trademarks